US010604188B2

(12) United States Patent
Yoshii

(10) Patent No.: US 10,604,188 B2
(45) Date of Patent: Mar. 31, 2020

(54) PROTECTION STRUCTURE OF HIGH VOLTAGE ELECTRICAL EQUIPMENT UNIT

(71) Applicant: HONDA MOTOR CO., LTD., Minato-ku, Tokyo (JP)

(72) Inventor: Masakazu Yoshii, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 45 days.

(21) Appl. No.: 15/943,893

(22) Filed: Apr. 3, 2018

(65) Prior Publication Data

US 2018/0290689 A1  Oct. 11, 2018

(30) Foreign Application Priority Data

Apr. 11, 2017 (JP) .................................. 2017-078496
May 31, 2017 (JP) .................................. 2017-107858

(51) Int. Cl.
| | |
|---|---|
| *B62D 21/15* | (2006.01) |
| *B62D 25/08* | (2006.01) |
| *B60L 3/00* | (2019.01) |
| *B60K 5/12* | (2006.01) |
| *B60K 1/00* | (2006.01) |
| *B60K 1/04* | (2019.01) |

(52) U.S. Cl.
CPC ............. *B62D 21/152* (2013.01); *B60K 1/00* (2013.01); *B60K 5/12* (2013.01); *B60L 3/0007* (2013.01); *B62D 25/085* (2013.01); *B60K 2001/0411* (2013.01); *B60L 2210/10* (2013.01); *B60L 2210/40* (2013.01); *B60Y 2306/01* (2013.01)

(58) Field of Classification Search
CPC ................ B62D 21/152; B62D 25/085; B60K 2001/0411; B60K 5/12; B60K 1/00; B60L 2210/40; B60L 2210/10; B60L 3/0007; B60Y 2306/01
See application file for complete search history.

(56) References Cited

FOREIGN PATENT DOCUMENTS

JP    2013-103585    5/2013

*Primary Examiner* — D Glenn Dayoan
*Assistant Examiner* — Melissa Ann Bonifazi
(74) *Attorney, Agent, or Firm* — Amin, Turocy & Watson, LLP

(57) ABSTRACT

The high voltage electric equipment unit is mounted in between left and right side frames of a vehicle body, and is disposed so that at least a portion of an outer side surface of the unit case in a vehicle width direction faces an inner side surfaces of the side frame in the vehicle width direction. A protective structure includes a plurality of contact surfaces formed on the outer side surface of the unit case in the vehicle width direction, a flat section formed in a region surrounded by the plurality of contact surfaces of the outer side surface so as to protrude outward in the vehicle width direction with respect to other area inside the region, and a plate-shaped guard member fixed to the plurality of contact surfaces and facing the flat section via a predetermined gap.

2 Claims, 8 Drawing Sheets

PROTECTION STRUCTURE OF HIGH VOLTAGE ELECTRICAL EQUIPMENT UNIT

CROSS-REFERENCE TO RELATED APPLICATION

Priority is claimed on Japanese Patent Application No. 2017-078496, filed Apr. 11, 2017, and Japanese Patent Application No. 2017-107858, filed May 31, 2017, the contents of which are incorporated herein by reference.

BACKGROUND OF THE INVENTION

Field of the Invention

The present invention relates to a protection structure of a high voltage electrical equipment unit in a vehicle.

Description of Related Art

In a vehicle such as an electric automobile or the like, a rotating electric machine provided for vehicle driving or regenerative power generation and a power control unit configured to control the rotating electric machine are accommodated in a motor compartment of a vehicle body front section. In the power control unit, high voltage electric equipment parts such as an inverter, a DC-DC converter, or the like, are accommodated in a metal unit case. For this reason, in the power control unit of such a vehicle, even when a large load is input to the vehicle from the outside, it is important to sufficiently protect the high voltage electric equipment parts in the unit case. Based on these circumstances, even when a large load is input from the outside, various countermeasures capable of sufficiently protecting the high voltage electric equipment parts have been proposed (for example, see Japanese Unexamined Patent Application, First Publication No. 2013-103585).

In the protection structure of a high voltage electrical equipment unit disclosed in Japanese Unexamined Patent Application, First Publication No. 2013-103585, the unit case is attached to a vehicle body frame by a unit support frame, and in this state, a circumferential region of the unit case is surrounded and protected by the unit support frame. In addition, a guard member configured to protect the unit case from a protrusion of a radiator in the front of the vehicle is installed in an area facing the protrusion. The guard member is constituted by a plate-shaped member formed of a metal, and attached to bridge the unit support frame and a high strength area on the unit case.

SUMMARY OF THE INVENTION

Since the protection structure of a high voltage electrical equipment unit disclosed in Japanese Unexamined Patent Application, First Publication No. 2013-103585 has a structure in which the unit case is attached to the vehicle body frame by the large unit support frame, a wide range of the circumferential region of the unit case can be protected by the unit support frame. However, such a large unit support frame may not be employed in certain vehicles.

In addition, as disclosed in Japanese Unexamined Patent Application, First Publication No. 2013-103585, when a plate-shaped guard member configured to cover a surface of the unit case that is a protection target is disposed, the high voltage electric equipment parts in the unit case can be protected as long as a deformation behavior of an abutting section of the vehicle body structure is simple and stabilized. However, for example, when side frames of the vehicle body are displaced toward side surfaces of the unit case in a diagonal direction in accordance with bending displacement of the side frames of the vehicle body when a collision load is input, a variance of load input positions from the side frames on the side surfaces of the unit case becomes wider, and as a result, increase in size of the guard member covering the side surfaces of the unit case cannot be avoided. Then, when the guard member is increased in size, this tends to cause an increase in vehicle weight and a rise in product cost.

An aspect of the present invention is to provide a protection structure of a high voltage electrical equipment unit capable of protecting high voltage electric equipment parts in a unit case without causing an increase in size of a guard member.

A protection structure of a high voltage electrical equipment unit according to the present invention employs the following configurations.

(1) A protection structure of a high voltage electrical equipment unit according to an aspect of the present invention is a protection structure of a high voltage electrical equipment unit that has a unit case configured to accommodate a high voltage electric equipment part therein, that is mounted in between left and right side frames of a vehicle body, and that is disposed so that at least a portion of an outer side surface of the unit case in a vehicle width direction faces an inner side surface of the side frame in the vehicle width direction, the protection structure of a high voltage electrical equipment unit including: a plurality of contact surfaces formed on the outer side surface of the unit case in the vehicle width direction; a flat section that is formed in a region surrounded by the plurality of contact surfaces of the outer side surface so as to protrude outward in the vehicle width direction with respect to other portion inside the region; and a plate-shaped guard member that is fixed to the plurality of contact surfaces and that faces the flat section via a predetermined gap.

According to the aspect of (1), upon collision, when the curved section of the side frame is displaced toward the outer side surface of the unit case in the vehicle width direction in a diagonal direction, the curved section of the side frame abuts the plate-shaped guard member, and the load is received by the contact surface of the unit case via the guard member. Here, when displacement in the diagonal direction of the curved section of the side frame further advances, the region surrounded by the plurality of contact surfaces of the guard member is deformed in a direction of the side surface of the unit case, and the back surface of the guard member abuts the flat section of the side surface of the unit case. An input load from the side frame is received by the plurality of contact surfaces and the flat section of the side surface of the unit case.

(2) In the aspect of (1), the an upper section-side case and a lower section-side case of the unit case may be fastened and fixed to each other at a flange section protruding outward in the vehicle width direction, and at least a portion of the flat section may be formed on an outer side surface of the flange section in the vehicle width direction.

According to the aspect of (2), since at least a portion of the flat section is formed in the flange section having high rigidity, the load input to the flat section from the curved section of the side frame can be received with high rigidity of the flange section.

(3) In the aspect of (1) or (2), the guard member may include a flat receiving section facing the flat section, and a swelling section that is formed on a rear end of the receiving section and that is swelling outward in the vehicle width direction.

According to the aspect of (3), upon collision, when the curved section of the side frame is displaced in a direction in which it approaches the unit frame, the curved section abuts the receiving section of the guard member to deform the receiving section in a direction toward the unit case. When the curved section of the side frame is further displaced, the receiving section abuts the flat section of the unit case, and the curved section of the side frame also abuts the swelling section of the guard member. Here, displacement of the side frame toward a rear side of the vehicle is restricted by the swelling section. Accordingly, when the configuration is employed, it is possible to suppress the curved section of the side frame from protruding from the guard member and from directly abutting the unit case.

(4) In the aspect any one of (1) to (3), a slit extending from surroundings of the guard member toward an inner region of the guard member may be formed in the guard member.

According to the aspect of (4), upon collision, when the curved section of the side frame abuts the guard member, the inner region of the guard member deforms in a direction in which it approaches the flat section of the side surface of the unit case when the neighboring section of the slit starts to deform. Accordingly, displacement of the curved section of the side frame is easily restricted by the deformed region of the guard member.

(5) In the aspect of (4), the guard member may include a flat receiving section facing the flat section, and a swelling section that is formed on a rear end of the receiving section and that is swelling outward in the vehicle width direction, wherein the slit may cross the receiving section and the swelling section in a forward/rearward direction and may be opened at a rear edge of the guard member.

According to the aspect of (5), upon collision, when the curved section of the side frame abuts the receiving section of the guard member, the receiving section deforms in the direction of the unit case when the neighboring section of the slit starts to deform. In the case of the configuration, since the slit crosses the receiving section and the swelling section and is opened at the rear edge of the guard member, it is possible to make a trigger for deformation of the receiving section while restricting the excessive displacement of the curved section of the side frame toward the rear side by the swelling section.

According to an aspect of the present invention, the flat section surrounded by the plurality of contact surfaces is formed on the outer side surface of the unit case in the vehicle width direction, the plate-shaped guard member is fixed to the plurality of contact surfaces, and a predetermined gap is formed between the guard member and the flat section. For this reason, when the curved section of the side frame can be displaced toward the outer side surface of the unit case in the vehicle width direction in the diagonal direction upon input of a collision load, an input load from the side frame is dispersed and received by the contact surface and the flat section. In addition, in another aspect of the present invention, the flat section of the unit case formed on the outer side surface in the vehicle width direction protrudes outward in the vehicle width direction with respect to other area in the region surrounded by the plurality of contact surfaces. For this reason, even if a load input position of the curved section of the side frame is varied, a load of the side frame can be received by the flat section via the guard member.

Accordingly, according to the aspect of the present invention, since the input load from the side frame can be efficiently received by the side surfaces of the guard member and the unit case, high voltage electric equipment parts in the unit case can be protected while suppressing an increase in size of the guard member.

DETAILED DESCRIPTION OF THE INVENTION

Figure 1:
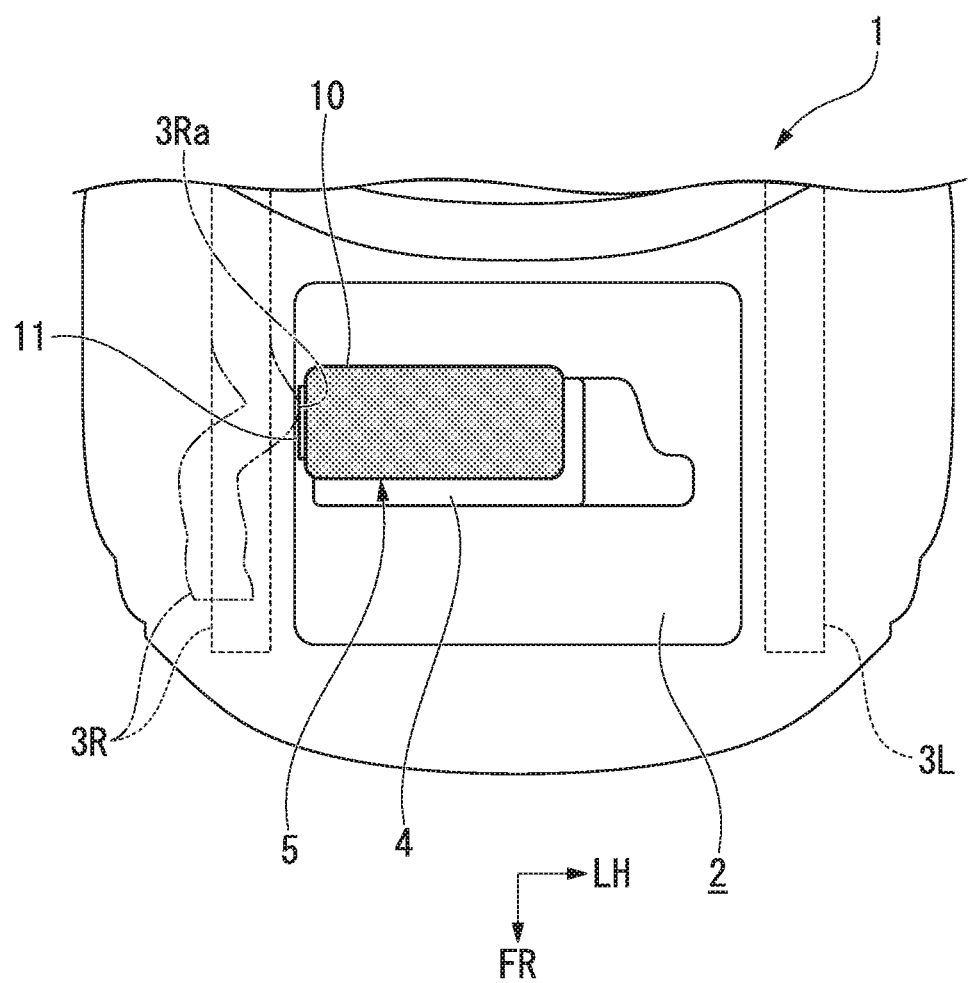
FIG. 1 is a plan view of a vehicle front section on which a high voltage electric equipment unit of an embodiment of the present invention is mounted.

Hereinafter, an embodiment of the present invention will be described with reference to the accompanying drawings.

A vehicle according to the embodiment is an electric automobile driven by a motor (a rotating electric machine). However, the vehicle is not limited to a vehicle driven by a motor and may be a hybrid vehicle or the like driven by a combination of an engine and a motor. Further, in appropriate places in the drawings, an arrow FR showing a forward direction with respect to the vehicle, an arrow UP showing an upward direction with respect to the vehicle, and an arrow LH showing a leftward direction with respect to the vehicle are provided.

FIG. 1 is a schematic plan view showing a motor compartment 2 in front of a passenger compartment of a vehicle 1.

Side frames 3L and 3R extending substantially in a forward/rearward direction of a vehicle body are disposed at both of left and right sides of the motor compartment 2. Various functional parts such as a motor 4 for driving the vehicle (a rotating electric machine), suspension parts (not shown) of a front side, an air conditioner (not shown), a radiator (not shown), or the like, are supported by the side frames 3L and 3R. The motor 4 is disposed at substantially a center of the motor compartment 2. A power control unit 5 (PCU) that is a high voltage electric equipment unit is attached to an upper section of the motor 4. The power control unit 5 is disposed at a position deviated to the right side in the motor compartment 2.

Figure 2:
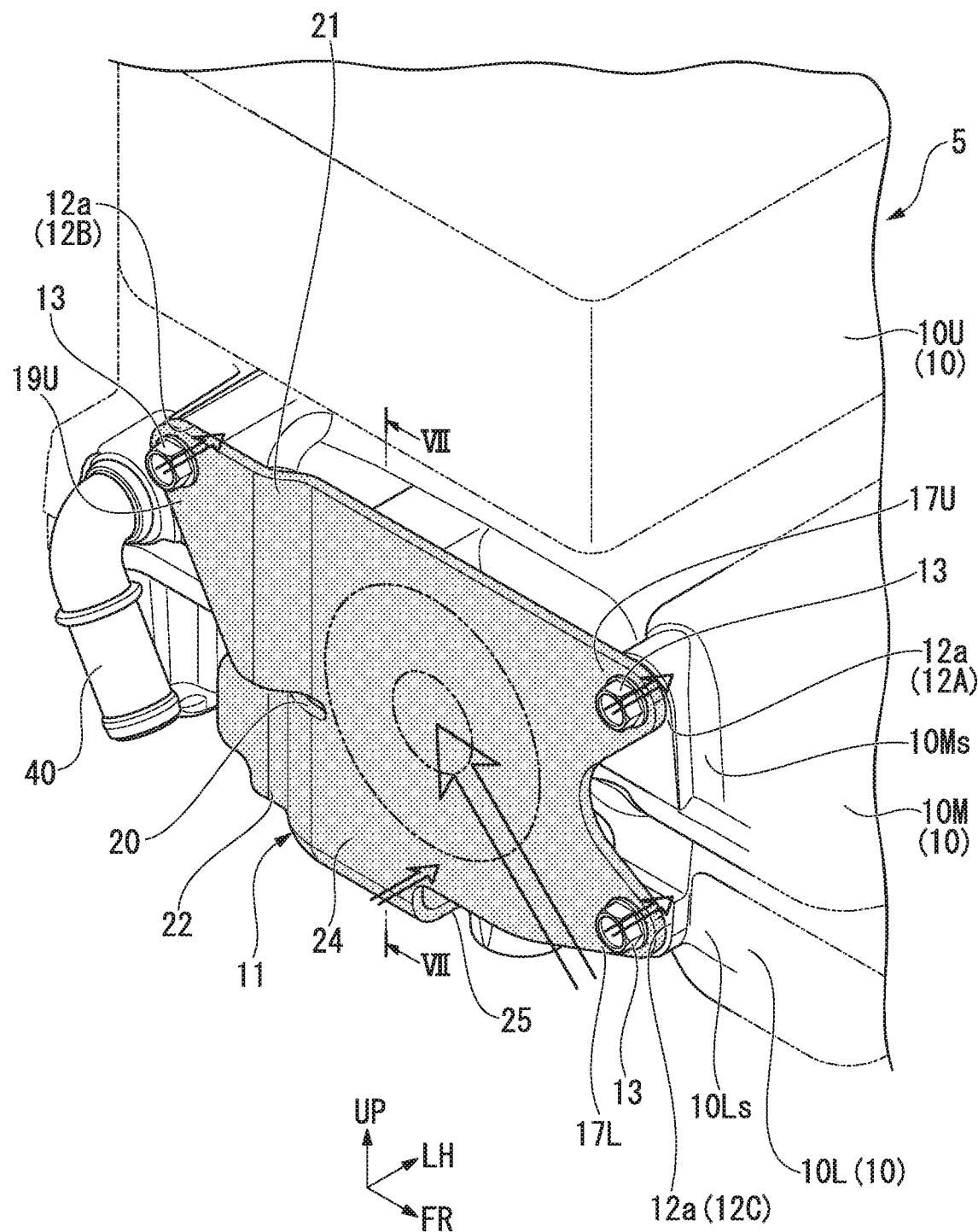
FIG. 2 is a perspective view of the high voltage electric equipment unit of the embodiment of the present invention.
Figure 3:
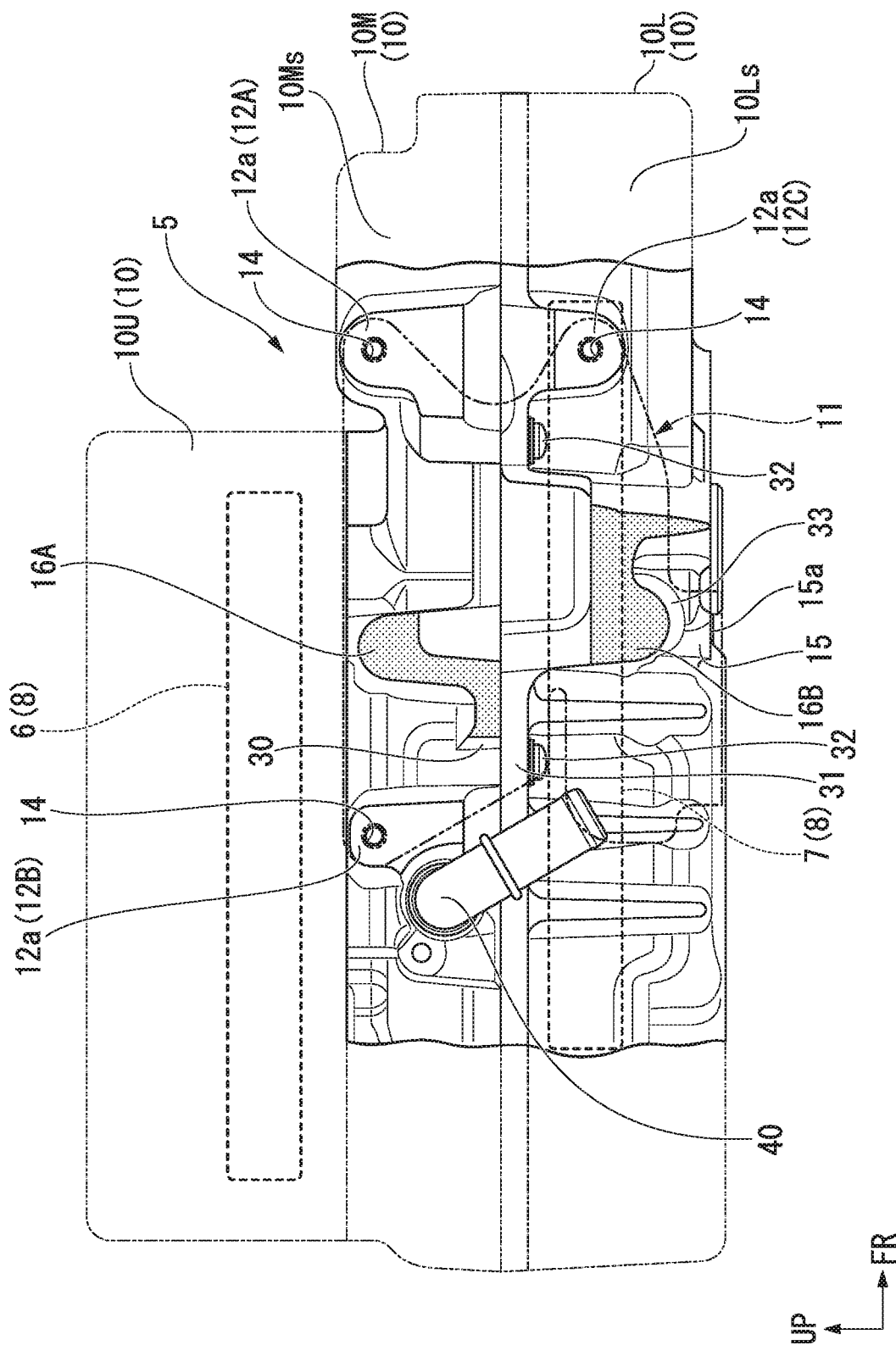
FIG. 3 is a side view in which a guard member of the high voltage electric equipment unit of the embodiment of the present invention is removed.
Figure 4:
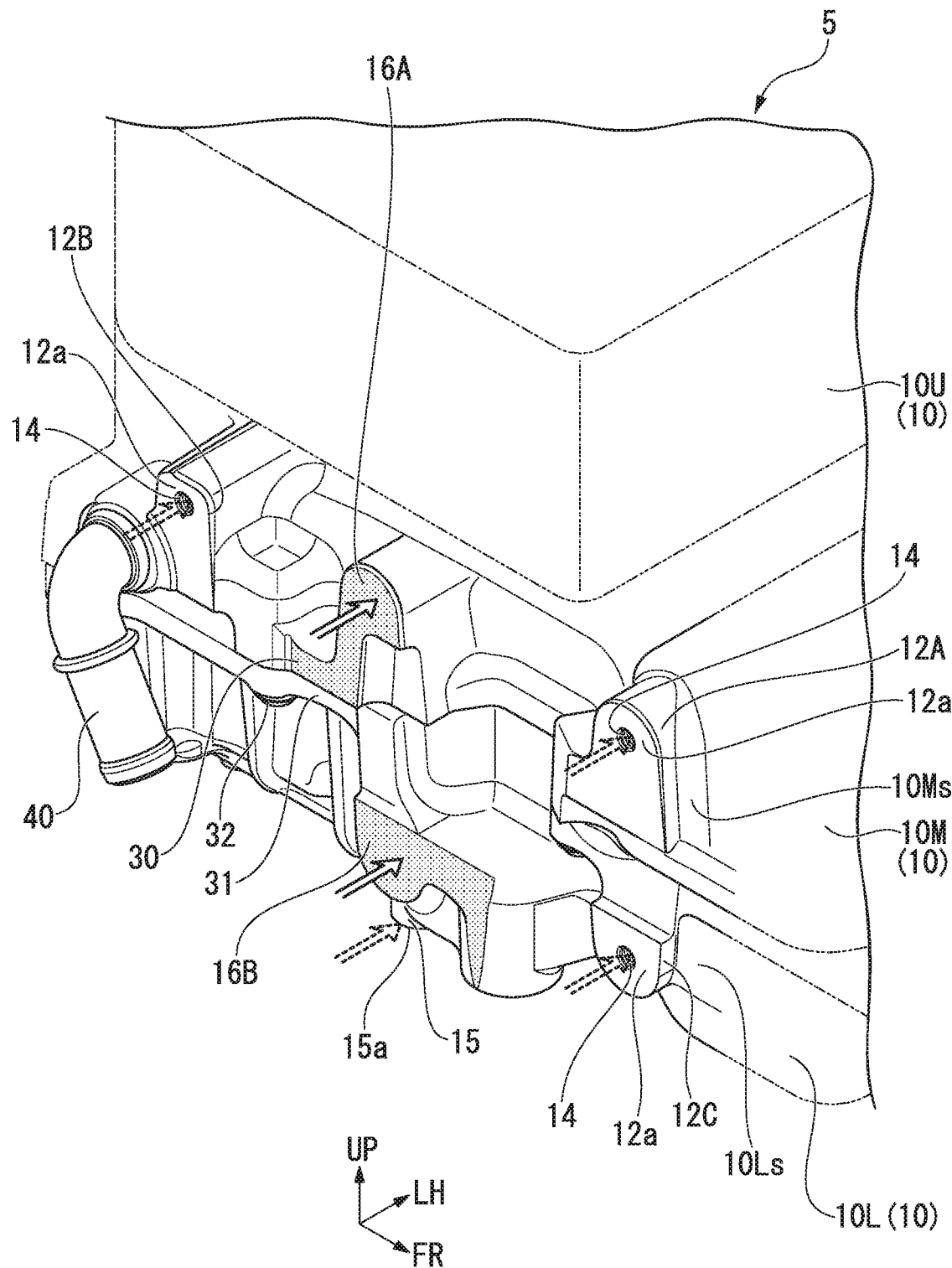
FIG. 4 is a perspective view in which the guard member of the high voltage electric equipment unit of the embodiment of the present invention is removed.

FIG. 2 is a view showing a right side portion of the power control unit 5 from a diagonally upper side of a right front section. In addition, FIG. 3 is a view showing a right side surface of the power control unit 5 from which a guard member 11 (to be described below) is removed, and FIG. 4 is a view showing the right side portion of the power control unit 5, from which the guard member 11 is removed similarly, from a diagonally upper side of the right front section.

The power control unit 5 has a unit case 10 formed of a metal in a substantially parallelepiped shape, in which high voltage electric equipment parts 8 (see FIG. 3) such as an inverter 6 (see FIG. 3), a DC-DC converter 7, or the like, are accommodated. The inverter 6 performs switching between direct current power of a high voltage battery (not shown) mounted in a vehicle rear section and alternating current power used in the motor 4 for driving the vehicle. The inverter 6 converts direct current power of the high voltage battery into three-phase alternating current and supplies alternating current power to the motor 4 when the vehicle travels, and converts alternating current power generated by the motor 4 into direct current and supplies the direct current to the high voltage battery when regenerative power is generated by the motor 4. The DC-DC converter 7 converts high voltage direct current power of the high voltage battery into low voltage direct current power used in a low voltage battery (not shown).

The unit case 10 has a lower case 10L, an upper case 10U and an intermediate case 10M, and the high voltage electric equipment parts 8 such as the inverter 6, the DC-DC converter 7, or the like, are mainly disposed in the lower case 10L and the upper case 10U. For example, a heat sink or the like is formed in the intermediate case 10M, and the high voltage electric equipment parts 8 can be cooled by a cooling liquid supplied from the outside.

Flange sections 30 and 31 swelling outward in a vehicle width direction are formed on a lower end portion of the intermediate case 10M and an upper end portion of the lower case 10L. The flange sections 30 and 31 extend outward in the vehicle width direction in side surfaces 10Ms and 10Ls of the intermediate case 10M and the lower case 10L positioned outside in the vehicle width direction. The intermediate case 10M and the lower case 10L are coupled by a fastening member 32 such as a bolt or the like in a state in which the flange sections 30 and 31 are matched to each other.

In the unit case 10, in a state in which the power control unit 5 is installed in the motor compartment 2 via the motor 4, the intermediate case 10M and the lower case 10L are disposed at substantially the same height as the left and right side frames 3L and 3R. Accordingly, the side frames 3L and 3R and the side surfaces of the power control unit 5 (the high voltage electric equipment unit) at least partially overlap each other when seen in a side view of the vehicle body. As described above, since the power control unit 5 is disposed at a position deviated rightward in the motor compartment 2, the side surfaces 10Ms and 10Ls of right sides of the intermediate case 10M and the lower case 10L are disposed in the vicinity of the side surface of the side frame 3R of the right side (the side surface on the side of the motor compartment 2).

The guard member 11 formed of a metal plate member is attached to a central region of the side surfaces 10Ms and 10Ls of the right sides of the intermediate case 10M and the lower case 10L of the unit case 10 in the forward/rearward direction of the vehicle body. The guard member 11 suppresses a local load from being input to the intermediate case 10M or the lower case 10L from a curved section 3Ra (an abutting section) of the side frame 3R and thereby protects the high voltage electric equipment parts 8 in the unit case 10 when the side frame 3R (a vehicle body structure) of the right side is bent and deformed toward the motor compartment 2 as shown by a chain line in FIG. 1 when a collision load from a front side of the vehicle is input or the like.

As shown in FIGS. 3 and 4, a pair of boss sections 12A and 12B having flat end surfaces 12a is provided so as to protrude from the side surface 10Ms of the right side of the intermediate case 10M to be separated in the forward/rearward direction of the vehicle body. The end surfaces 12a of the boss sections 12A and 12B become a contact surface on which front and rear upper edge portions of the guard member 11 are fastened and fixed by bolts 13 (see FIG. 2 or the like). Further, reference numeral 40 in the drawings designates a connecting section of cooling water pipeline installed on the vicinity of the rear of the boss section 12B of a rear side, in the side surface 10Ms of the right side of the intermediate case 10M.

Like the boss sections 12A and 12B of the intermediate case 10M, a boss section 12C having a flat end surface 12a is provided so as to protrude from the side surface 10Ls of the right side of the lower case 10L. The boss section 12C of the lower case 10L is disposed substantially directly under the boss section 12A in front of the intermediate case 10M. The end surface 12a of the boss section 12C of the lower case 10L becomes a contact surface to which a lower edge portion in front of the guard member 11 is fastened by the bolt 13. The boss sections 12A, 12B and 12C of the intermediate case 10M and the lower case 10L protrude rightward from the vehicle body. Further, reference numeral 14 in the drawings designates bolt fastening holes formed in the boss sections 12A, 12B and 12C.

In addition, as shown in FIGS. 3 and 4, a boss section 15 protruding downward is formed at a position in the lower surface of the lower case 10L in the vicinity of the side surface 10Ls of the right sides of substantially a center in the forward/rearward direction. The end surface of the boss section 15 becomes an end surface 15a to which a lower curved piece 25 (to be described below) of the guard member 11 is fastened by a bolt.

As shown in FIGS. 3 and 4, a flat section 16A having a flat end surface facing a right side of the vehicle is formed at a substantially intermediate position in the side surface 10Ms of the right side of the intermediate case 10M between the boss section 12A of the front side and the boss section 12B of the rear side. The flat section 16A protrudes further rightward (outside in the vehicle width direction) in comparison with another area in a region between the boss sections 12A and 12B that are in the front and rear sides of the side surface 10Ms of the right side of the intermediate case 10M. In addition, the flat section 16A is formed on a portion of a right side surface of the flange section 30 formed on the upper end portion of the intermediate case 10M. Further, the flat section 16A is formed lower than a protrusion height (a height of the end surface 12a) of the boss sections 12A, 12B and 12C.

A flat section 16B having a flat end surface facing a right side of the vehicle is formed in the side surface 10Ls of the right side of the lower case 10L at a position which is further rearward than the boss section 12C. The flat section 16B on the side of the lower case 10L is formed on the lower case 10L such that a portion of the rear region of the flat section 16B overlaps in the forward/rearward direction with a portion of the front region of the flat section 16A at the side of the intermediate case 10M. Like the flat section 16A at the side of the intermediate case 10M, the flat section 16B at the side of the lower case 10L also protrudes further rightward (outside in the vehicle width direction) in comparison with another area of the side surface 10Ls of the right side of the lower case 10L at a further rear side than the boss section 12C. In addition, the flat section 16B is formed lower than the protrusion height (the height of the end surface 12a) of the boss sections 12A, 12B and 12C. In addition, the flat section 16B is formed on a right side surface of a swelling section 33 continuously formed below the flange section 31 of the lower case 10L.

Figure 5:
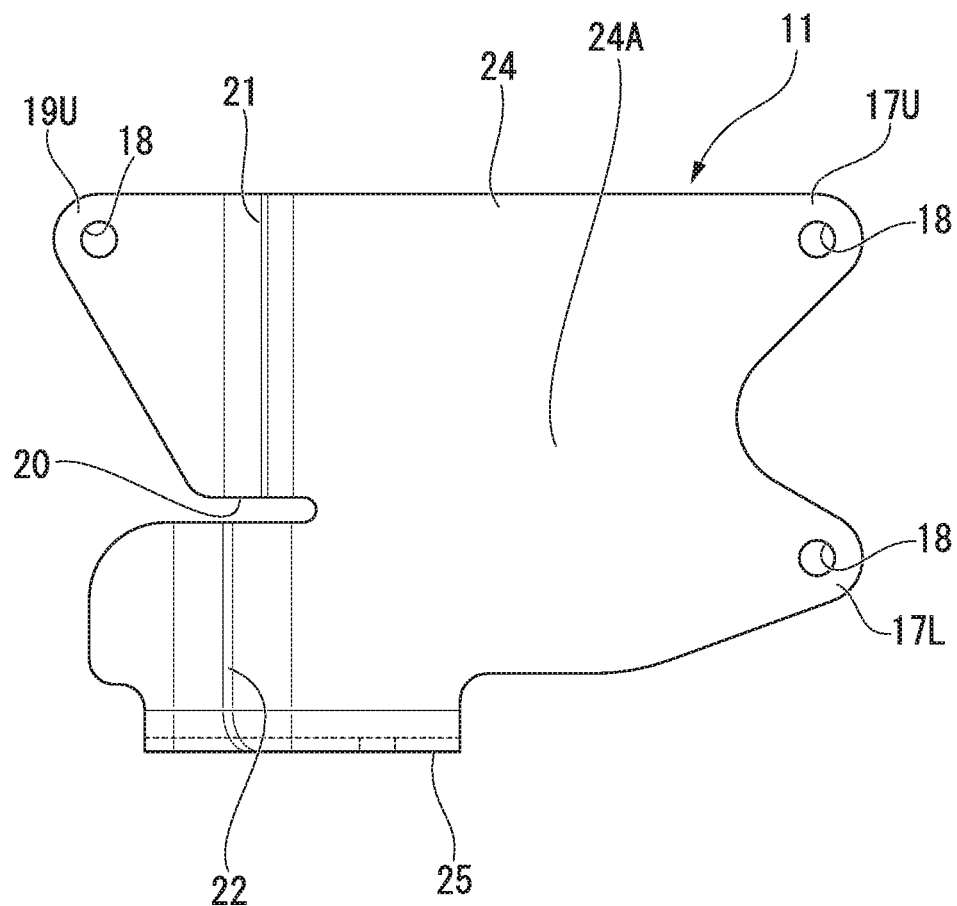
FIG. 5 is a front view of the guard member of the embodiment of the present invention.
Figure 6:
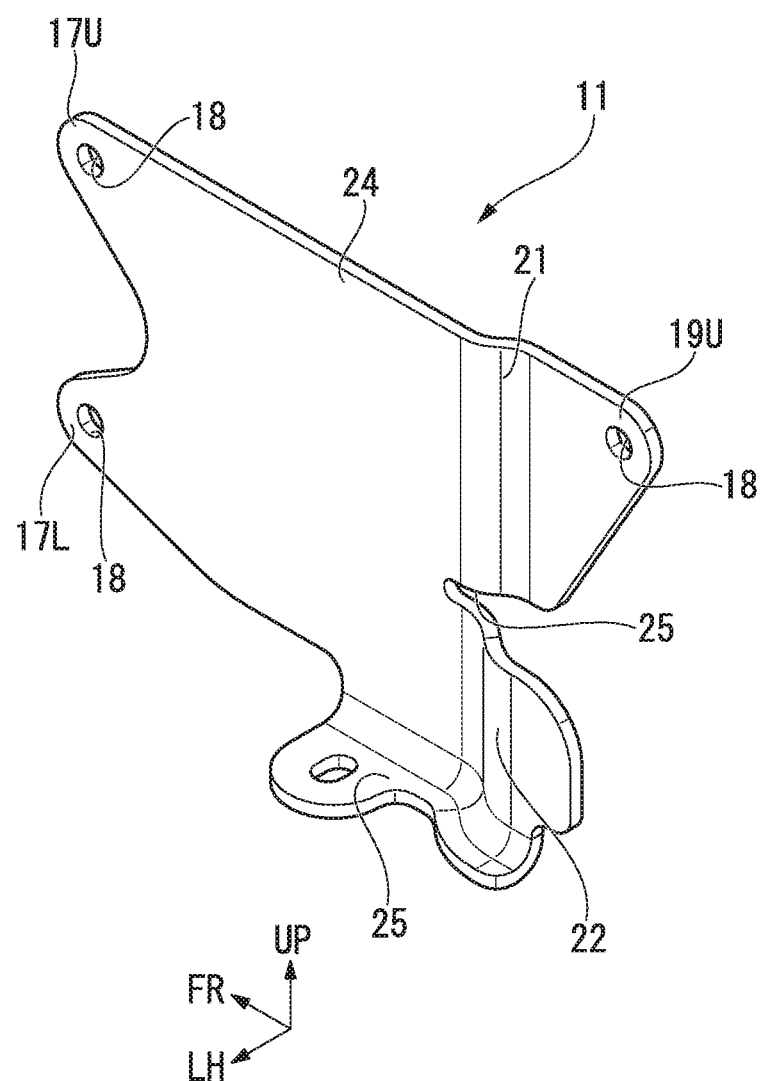
FIG. 6 is a perspective view of the guard member of the embodiment of the present invention.

FIG. 5 is a front view of the guard member 11, and FIG. 6 is a perspective view showing the guard member 11 from a back surface side.

The guard member 11 has a main wall 24 having a substantially parallelepiped shape formed in a front view, and the lower curved piece 25 curved inward in the vehicle width direction from a lower edge of the main wall 24 which is close to the rear section. A front side of the main wall 24 is formed such that a central region in the upward/downward direction is recessed in substantially a U shape toward the rear side, and bolt through-holes 18 are formed in a swelling section 17U on the side of the upper section and a swelling section 17L on the side of the lower section of the front side.

A rear side of the main wall 24 of the guard member 11 is formed such that a central region in the upward/downward direction is recessed in substantially a V shape toward the front side, and the bolt through-holes 18 are formed in a swelling section 19U on the side of the upper section of the rear side. A slit 20 having a substantially certain width and extending forward from a bottom section of the substantially V-shaped recessed section toward the central region of the main wall 24 is formed on the bottom section of the substantially V-shaped recessed section of the rear side of the main wall 24. The slit 20 extends from a rear side (surroundings) of the guard member 11 toward an inner region of the guard member 11.

In addition, an outward curved section 21 slightly curved in a step shape toward the outside (a right side) in the vehicle width direction is formed from a central region side of the main wall 24 toward a rear edge portion of the main wall 24 and is formed on an upper region of the slit 20 in the main wall 24 of the guard member 11. Further, a region of the main wall 24 further forward than the outward curved section 21 becomes a flat receiving section 24A that can abut with the intermediate case 10M and the flat sections 16A and 16B of the lower case 10L. The outward curved section 21 configures a swelling section formed on a rear end of the receiving section 24A and swelling outward in the vehicle width direction. Meanwhile, an inward curved section 22 slightly curved in a step shape toward the inside (a left side) in the vehicle width direction is formed from the central region side of the main wall 24 toward the rear edge portion of the main wall 24 and is formed in a lower region of the slit 20 of the main wall 24.

In the guard member 11, the swelling sections 17U, 17L and 19U in front of and in rear of the main wall 24 overlap with the boss sections 12A, 12B and 12C of the intermediate case 10M and the lower case 10L of the unit case 10, and in this state, the swelling sections 17U, 17L and 19U are fastened and fixed to the boss sections 12A, 12B and 12C by the bolt 13. In addition, the lower curved piece 25 overlaps with the boss section 15 of the lower surface of the lower case 10L, and in this state, the lower curved piece 25 is fastened and fixed to the boss section 15 by the bolt 13. Accordingly, a substantially central region in the forward/rearward direction of the side surfaces 10Ms and 10Ls of the right sides of the intermediate case 10M and the lower case 10L is covered by the guard member 11.

Figure 7:
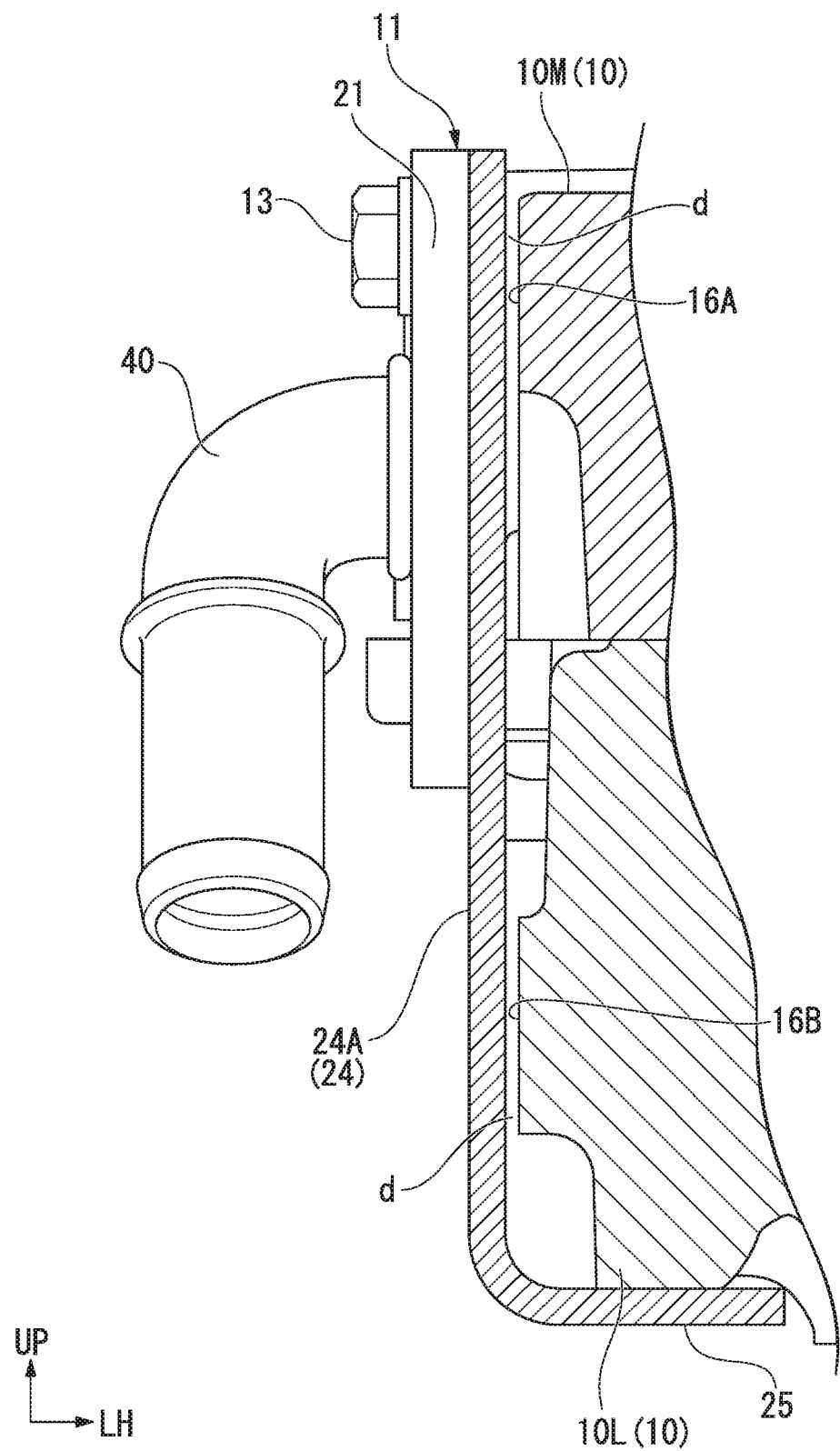
FIG. 7 is a cross-sectional view of the high voltage electric equipment unit of the embodiment of the present invention taken along line VII-VII in FIG. 2.

FIG. 7 is a cross-sectional view taken along line VII-VII in FIG. 2.

As described above, in a state in which the guard member 11 is attached to the intermediate case 10M and the lower case 10L, the receiving section 24A of the main wall 24 faces the flat sections 16A and 16B of the intermediate case 10M and the lower case 10L via a predetermined gap d.

Figure 8:
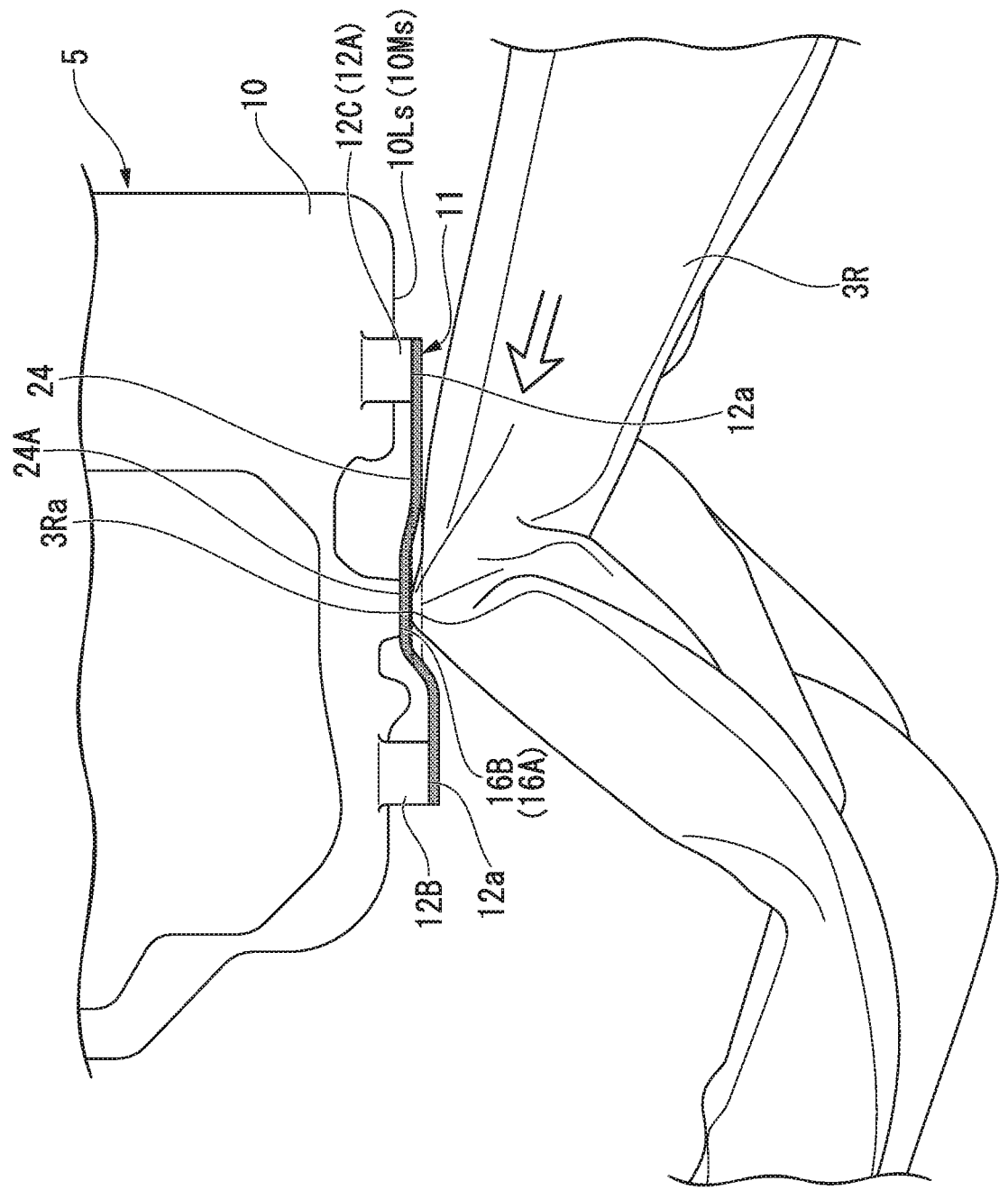
FIG. 8 is a schematic bottom view showing a deformation behavior of a vehicle body frame and the guard member of the embodiment of the present invention.

FIG. 8 is a schematic bottom view showing a deformation behavior of the right side frame 3R and the guard member 11 when a collision load is input from a front side of the vehicle. Further, the guard member 11 is shown as a cross section in FIG. 8.

As shown in FIG. 8, when a collision load is input from a front side of the vehicle, the intermediate section of the side frame 3R is bent and deformed inward in the vehicle width direction while the side frame 3R of the vehicle body is buckled from the front side. Here, the curved section 3Ra of the side frame 3R is displaced to approach the right side surfaces of the intermediate case 10M and the lower case 10L of the power control unit 5 from a diagonal front side as shown by arrows in FIGS. 2 and 8. Accordingly, the curved section 3Ra of the side frame 3R abuts the receiving section 24A of the main wall 24 of the guard member 11, and the load is received by the end surfaces 12a and 15a of the boss sections 12A, 12B, 12C and 15 of the intermediate case 10M and the lower case 10L via the guard member 11.

When displacement further advances toward a diagonal rear side of the curved section 3Ra of the side frame 3R in this way, the central region (the receiving section 24A) of the main wall 24 of the guard member 11 surrounded by the plurality of boss sections 12A, 12B, 12C and 15 is deformed in directions toward the side surfaces 10Ms and 10Ls of the intermediate case 10M and the lower case 10L. Here, since the slit 20 is formed in the rear edge portion of the main wall 24 of the guard member 11, by deforming from a neighboring section of the slit 20, the central region of the main wall 24 is deformed in the directions toward the side surfaces 10Ms and 10Ls and the back surface of the main wall 24 abuts the flat sections 16A and 16B of the intermediate case 10M and the lower case 10L. Accordingly, an input load from the curved section 3Ra of the side frame 3R is received by the boss sections 12A, 12B, 12C and 15 and the flat sections 16A and 16B of the intermediate case 10M and the lower case 10L. Further, here, since the flat sections 16A and 16B protrude outward in the vehicle width direction with respect to another area of surroundings, an area in which a direct load input is undesirable other than the flat sections 16A and 16B can be protected.

In addition, the slit 20 crosses over a boundary portion between the receiving section 24A and the outward curved section 21 (the restriction section) of the guard member 11 in the forward/rearward direction, and is opened at the rear edge portion of the guard member 11. For this reason, when a collision load is input, the receiving section 24A in front of the outward curved section 21 can be deformed without largely deforming the outward curved section 21.

After the receiving section 24A of the main wall 24 of the guard member 11 abuts the flat sections 16A and 16B of the intermediate case 10M and the lower case 10L in this way, even if the curved section 3Ra of the side frame 3R is slightly displaced rearward along the flat sections 16A and 16B, excessive displacement of the curved section 3Ra of the side frame 3R is restricted by the receiving section 24A of the main wall 24 of the guard member 11. That is, since the receiving section 24A of the main wall 24 of the guard member 11 is surrounded by the boss sections 12A, 12B, 12C and 15 of the intermediate case 10M and the lower case 10L, they restrict excessive deformation, and as a result, the receiving section 24A of a center of the main wall 24 restricts excessive displacement of the curved section 3Ra of the side frame 3R. As a result, the curved section 3Ra of the side frame 3R is suppressed from protruding from the main wall 24 of the guard member 11 and from abutting the side surface 10Ls of the lower case 10L.

As described above, the plurality of boss sections 12A, 12B, 12C and 15 in the vicinity of the side surfaces 10Ms and 10Ls of the right sides of the intermediate case 10M and the lower case 10L, and the flat sections 16A and 16B disposed in a region surrounded by the plurality of boss sections 12A, 12B, 12C and 15 and protruding outward in the vehicle width direction from other area in the region are formed in the protection structure of a high voltage electrical equipment unit according to the embodiment, the guard member 11 having a plate shape is fixed to the plurality of boss sections 12A, 12B, 12C and 15, and the predetermined gap d is formed between the guard member 11 and the flat sections 16A and 16B. For this reason, when a collision load is input, the side frame 3R is bent inward in the vehicle width direction, and when the curved section 3Ra is displaced toward the side surfaces 10Ms and 10Ls of the right sides of the intermediate case 10M and the lower case 10L from a diagonal front side, an input load from the curved section 3Ra can be dispersed and received by the plurality of boss sections 12A, 12B, 12C and 15 and the flat sections 16A and 16B. Then, excessive displacement of the curved section 3Ra of the side frame 3R at this time can be restricted by the central deformation region of the main wall 24 of the guard member 11 surrounded by the plurality of boss sections 12A, 12B, 12C and 15.

In addition, since the flat sections 16A and 16B of the intermediate case 10M and the lower case 10L protrude outward in the vehicle width direction with respect to other portion in the region surrounded by the plurality of boss sections 12A, 12B and 12C, direct input of the load to other areas of the intermediate case 10M or the lower case 10L, i.e., a place other than the flat sections 16A and 16B, can be prevented.

Accordingly, when the protection structure of a high voltage electrical equipment unit according to the embodiment is employed, since an input load from the curved section 3Ra of the side frame 3R can be efficiently received in relatively narrow regions of the side surfaces of the guard member 11 and the unit case 10, the high voltage electric equipment parts in the unit case 10 can be protected while an increase in size of the guard member 11 is suppressed.

In addition, in the protection structure of a high voltage electrical equipment unit according to the embodiment, the flange sections 30 and 31 swelling outward in the vehicle width direction are formed on the lower section of the intermediate case 10M and the upper section of the lower case 10L, the intermediate case 10M and the lower case 10L is fixed by the fastening member 32 while abutting the flange sections 30 and 31 with each other, and a portion of the flat section 16A is formed on the side surface of the flange section 30. For this reason, when the curved section 3Ra of the side frame 3R abuts the flat sections 16A and 16B via the guard member 11, the input load can be received by the flange section 30 having high rigidity.

In addition, in the protection structure of a high voltage electrical equipment unit according to the embodiment, since the slit 20 extending from the surroundings toward the inner region is formed in the main wall 24 of the guard member 11, when the curved section 3Ra of the side frame 3R abuts the central region of the main wall 24 of the guard member 11, the central region of the main wall 24 is easily deformed in a direction in which it approaches the flat sections 16A and 16B when it is deformed from the neighboring section of the slit 20. Accordingly, when the configuration is employed, displacement of the curved section 3Ra of the side frame 3R is easily restricted by the deformed region of the main wall 24 of the guard member 11. Accordingly, the curved section 3Ra of the side frame 3R can be suppressed from protruding from the main wall 24 of the guard member 11, and can be more securely suppressed from abutting the side surface 10Ls of the lower case 10L.

Further, in the protection structure of a high voltage electrical equipment unit according to the embodiment, since the slit 20 crosses the receiving section 24A and the outward curved section 21 in the forward/rearward direction and is formed to be opened at the rear edge of the guard member 11, it is possible to make a trigger for deformation of the receiving section 24A while restricting excessive displacement toward the rear side of the curved section 3Ra of the side frame 3R by the outward curved section 21.

In addition, in the protection structure of a high voltage electrical equipment unit according to the embodiment, since the outward curved section 21 and the inward curved section 22 are respectively formed on the upper section and the lower section of the rear edge portion of the main wall 24 of the guard member 11 with respect to the slit 20 interposed therebetween, the main wall 24 can be attached to positions in the vicinity of the side surfaces 10Ms and 10Ls to match shapes of the side surfaces 10Ms and 10Ls of the unit case 10. Accordingly, a load input to the guard member 11 can be suppressed by the curved section 3Ra of the side frame 3R.

Further, the present invention is not limited to the above-mentioned embodiment and various design changes may be made without departing from the scope of the present invention. For example, while the pair of flat sections 16A and 16B are formed at two places in the outer side surfaces of the intermediate case 10M (the upper case) and the lower case 10L (the lower case) in the vehicle width direction, which are separated at upper and lower side of substantially a center in the forward/rearward direction in the above-mentioned embodiment, the flat section may be formed at one place at substantially a center in the forward/rearward direction and substantially a center in the upward/downward direction of the outer side surfaces of the upper case and the lower case in the vehicle width direction. In addition, a plurality of flat sections may be formed at a plurality of places separated from each other in the forward/rearward direction at substantially a center in the upward/downward direction of the outer side surfaces of the upper case and the lower case in the vehicle width direction.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A protection structure of a high voltage electrical equipment unit that has a unit case configured to accommodate a high voltage electric equipment part therein, that is mounted in between left and right side frames of a vehicle body, and that is disposed so that at least a portion of an outer side surface of the unit case in a vehicle width direction faces an inner side surface of the side frame in the vehicle width direction, the protection structure of the high voltage electrical equipment unit comprising:

a plurality of contact surfaces formed on the outer side surface of the unit case in the vehicle width direction;

a flat section that is formed in a region surrounded by the plurality of contact surfaces of the outer side surface so as to protrude outward in the vehicle width direction with respect to other portion inside the region; and a plate-shaped guard member that is fixed to the plurality of contact surfaces and that faces the flat section via a predetermined gap, wherein a slit extending from surroundings of the guard member toward an inner region of the guard member is formed in the guard member, wherein the guard member comprises a flat receiving section facing the flat section, and a swelling section that is formed on a rear end of the receiving section and that is swelling outward in the vehicle width direction, and wherein the slit crosses the receiving section and the swelling section in a forward/rearward direction and is opened at a rear edge of the guard member.

2. The protection structure of a high voltage electrical equipment unit according to claim 1, wherein an upper section-side case and a lower section-side case of the unit case are fastened and fixed to each other at a flange section protruding outward in the vehicle width direction, and at least a portion of the flat section is formed on an outer side surface of the flange section in the vehicle width direction.

* * * * *